Oct. 10, 1961

G. C. ELLERBECK 3,003,690

CALCULATING MACHINE

Filed Feb. 7, 1955

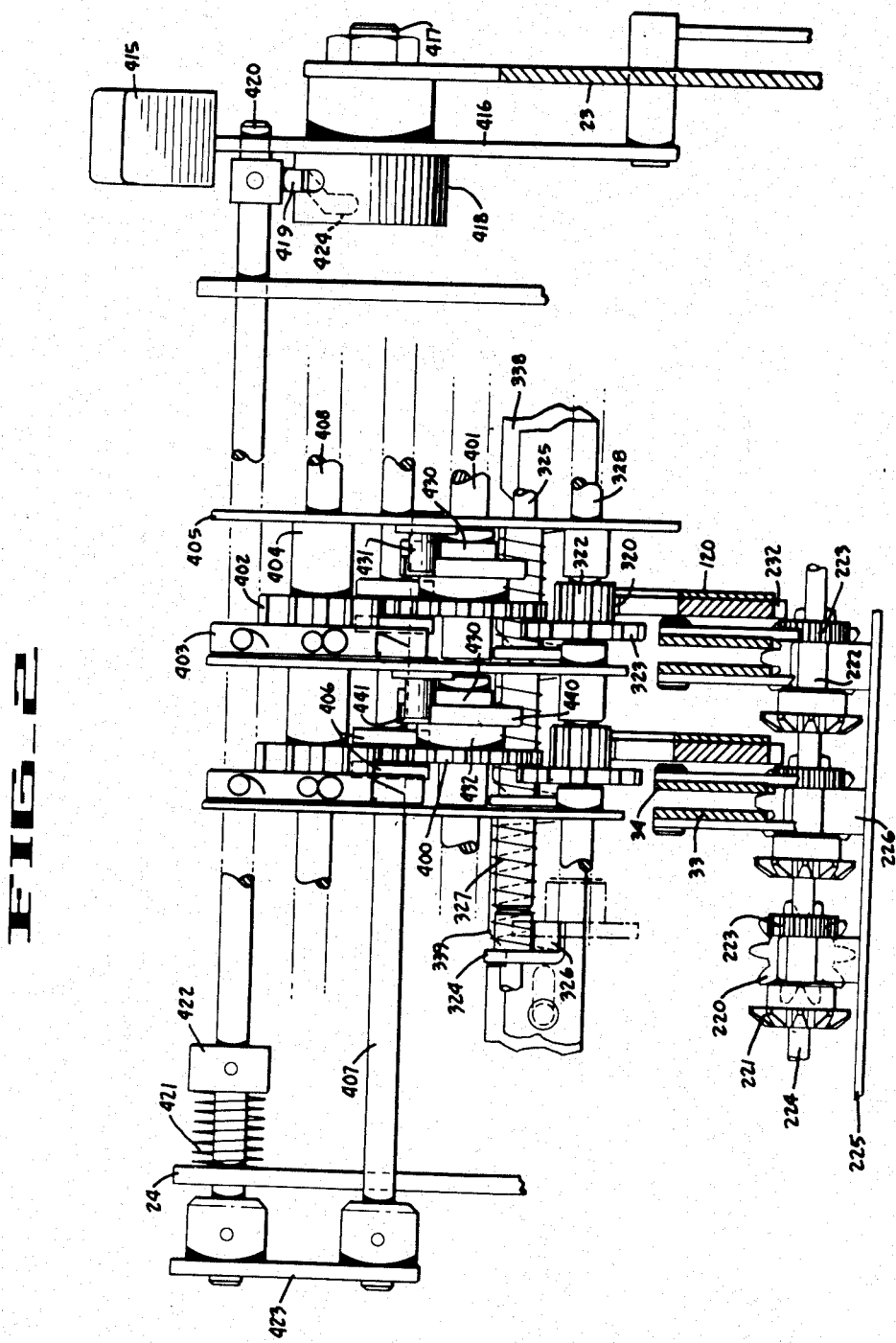

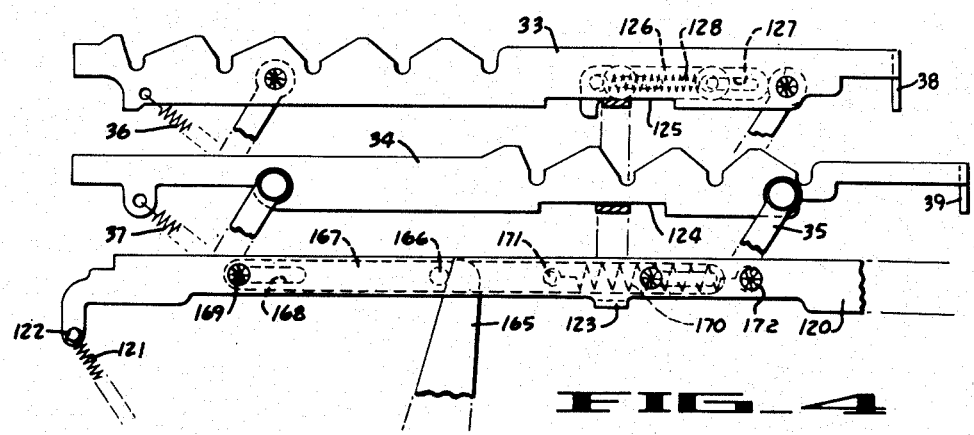
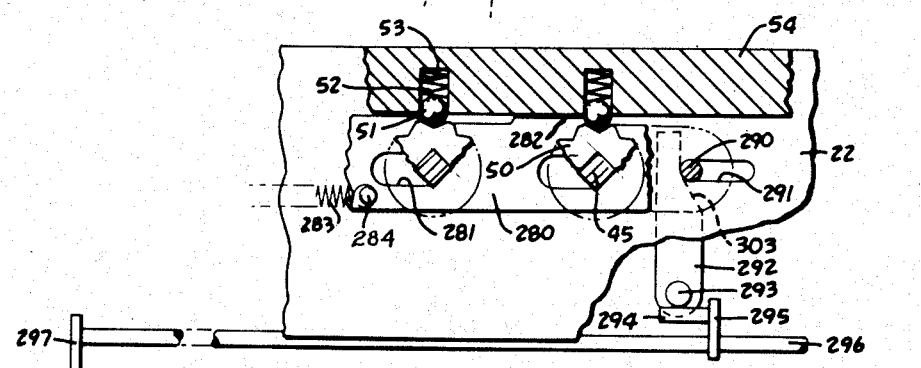
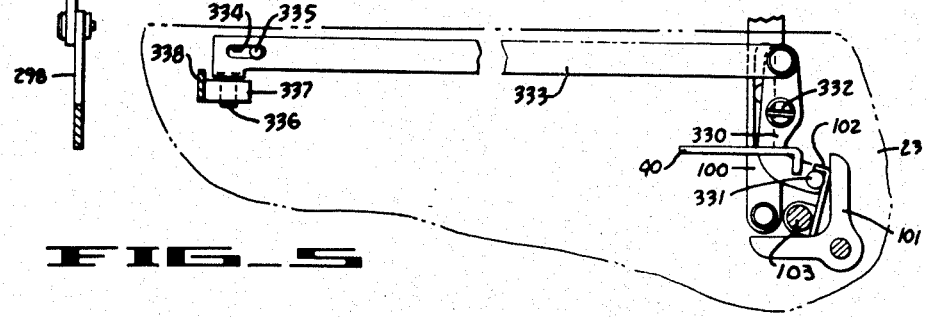

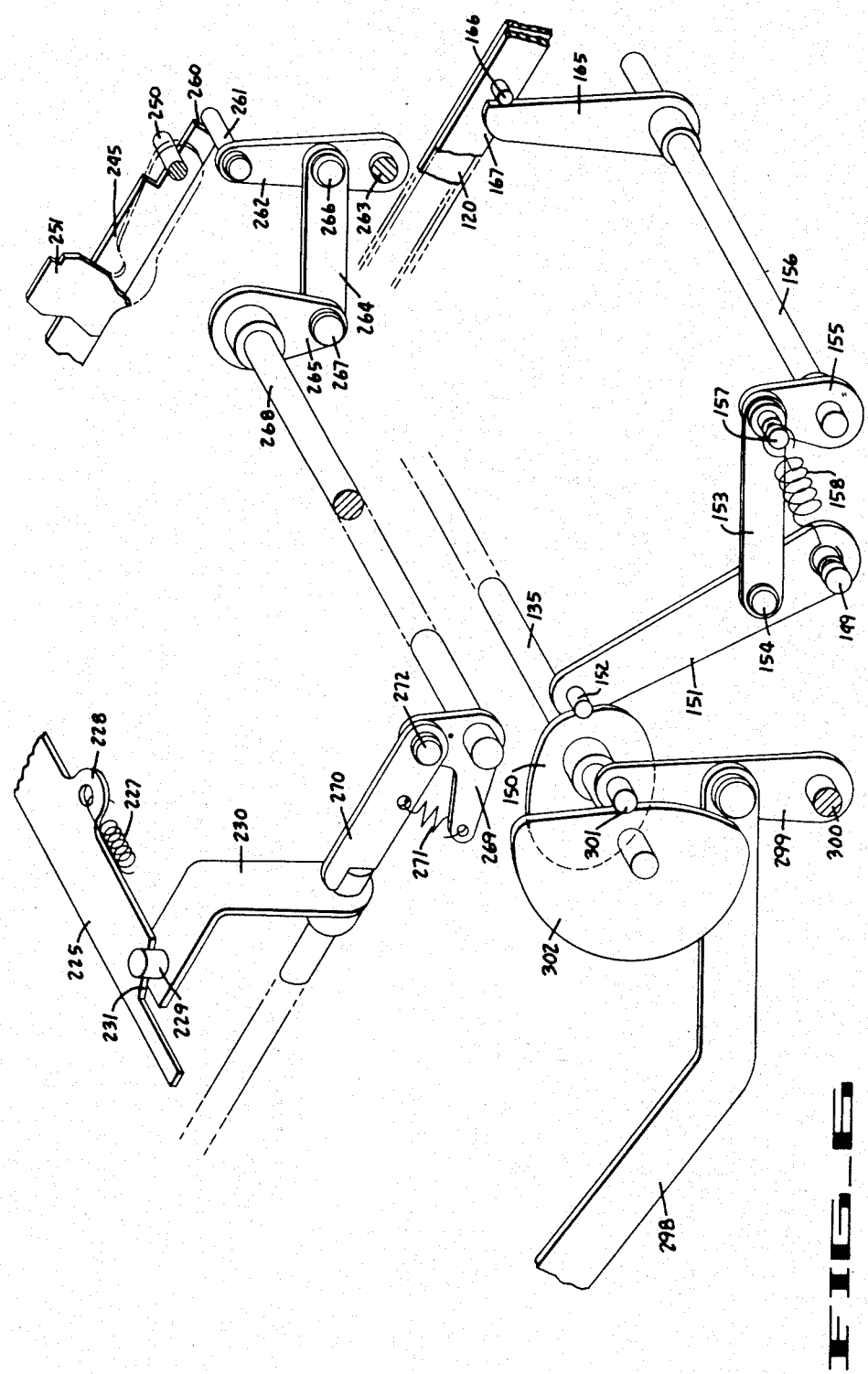

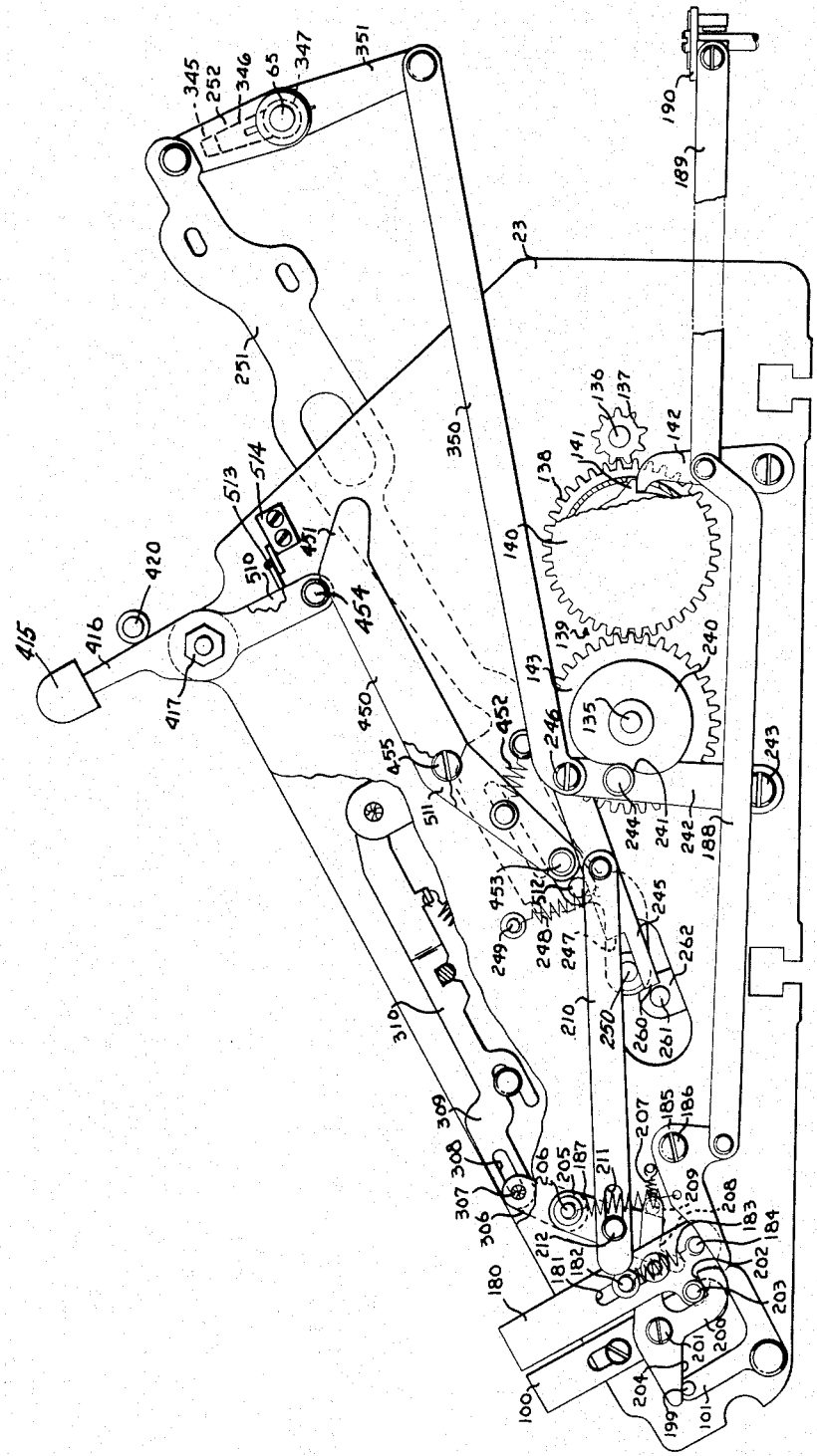

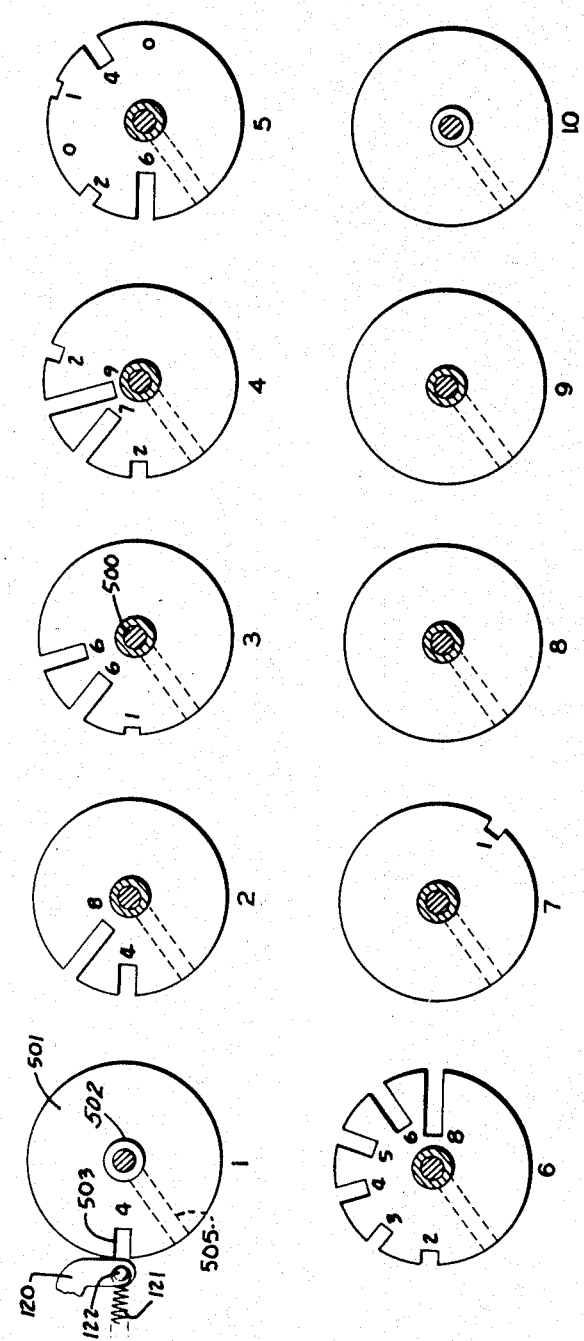
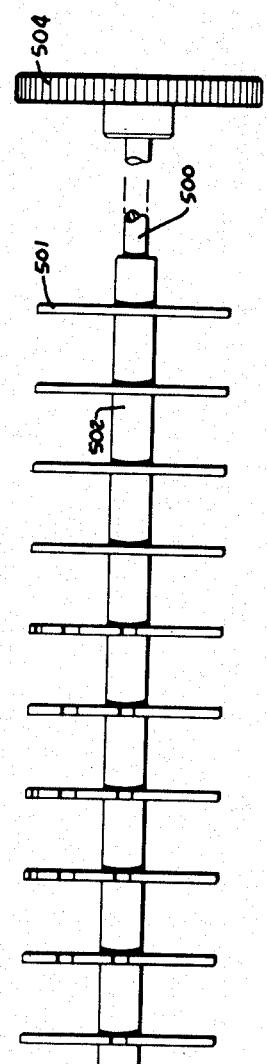

United States Patent Office 3,003,690
Patented Oct. 10, 1961

3,003,690
CALCULATING MACHINE
Grant C. Ellerbeck, San Leandro, Calif., assignor to Friden, Inc., a corporation of California
Filed Feb. 7, 1955, Ser. No. 486,323
17 Claims. (Cl. 235—73)

This application, which is a continuation-in-part of my copending application S.N. 427,162, filed May 3, 1954, subsequently abandoned, relates to a calculating machine, and particularly to a mechanism adapted to transfer values from the accumulator register directly into the selection mechanism of the machine or into a storage device in which such a value can be stored until the operator desires to use it.

A primary object of the present invention is to provide a mechanism, commonly called a "back-transfer" mechanism, for transferring values from the accumulator register of a calculating machine into the selection mechanism thereof. In the present invention, such values can be stored indefinitely during an infinite number of intermediate problems, and then used at the discretion of the operator without erasing it, so that such a value may be kept as a constant and used an infinite number of times.

Another primary object of the present invention is to provide a constant factor mechanism for the selection mechanism of a calculating machine, which mechanism is operative to hold a selected constant factor that can be set at the will of the operator into the selection mechanism whenever, and as often as, the operator desires.

An important object of the present invention is to provide a set of value indicating devices, or check dials, which are operative to show the value set in the constant factor mechanism, and which can be used, if desired, to store grand totals.

A general object of the present invention is to provide a single and relatively simple mechanism which can be used selectively to: (1) transfer the value standing in the accumulator register of a conventional calculating machine into an auxiliary member associated with each order of the selection mechanism, from which it can be directly transmitted to the selection mechanism or in which it can be stored as long as desired and used as often as desired; and (2) provide a constant factor mechanism by means of which any desired values may be set in the auxiliary member above-mentioned, and there stored for an infinite time, for use an infinite number of times, at the will of the operator. This mechanism is relatively simple and readily installed in a conventional calculating machine, and, as one important aspect, utilizes parts that are already used in machines for the extraction of square root as exemplified by Patent No. 2,736,494, issued February 28, 1956. In this respect the present invention is particularly adaped to provide a back-transfer mechanism which can be combined with the square root extraction mechanism described in said patent.

Another important object, or aspect, of the present invention is to provide a means for driving a back-transfer mechanism more efficiently and with less strain on conventional mechanisms. It can be noted at this point that back-transfer mechanisms heretofore designed generally are operated by clearing the accumulator register dials to "0" through the conventional clearing, or zeroizing, mechanism, while the dials are connected to the back-transfer mechanism. Ordinarily the clearing mechanisms are designed to clear the dials which are detented in their adjusted positions, but are not designed to operate against heavier forces, such as inertia. It will be readily understood that the back-transfer mechanism is necessarily large, relatively speaking, and therefore setting the back-transfer mechanism through the conventional clearing devices, through inertia alone, throws a heavy load on the clearing mechanism. In this respect, in the preferred form of my invention, I yieldingly operate the back-transfer mechanism to "pull" a value out of the register dials (blocking them against operation by suitable and conventional zero stops) rather than driving the back-transfer mechanism from the clearing devices.

A still further object of my invention is to provide a means for lessening the load on the clearing of accumulator dials, especially when those dials are operatively connected to a back-transfer mechanism, by automatically releasing the detents which are normally required to hold the dial and actuating mechanism in true differentially adjusted positions.

These and other objects of the present invention will become apparent from a consideration of the following description of the preferred embodiment of my invention taken in connection with the accompanying drawings in which:

FIG. 2 is a front view of the constant factor, or storage, mechanism of my invention, such as a view taken along the transverse plane indicated by the line 2—2 of FIG. 1.

FIG. 3 is an exploded view of one ordinal group of the selection members and the power-operated auxiliary member associated therewith.

FIG. 4 is a detail of the detent relieving means preferably associated with my invention.

FIG. 5 is a detail of the means for clearing the constant factor mechanism of my invention.

FIG. 6 is a perspective view of the operating elements of my invention.

FIG. 7 is a right side view of the operating mechanisms associated with my invention.

FIG. 8 is a detail view of the cams associated with the second embodiment of constant factor mechanism, and FIG. 9 is a rear view of the cam assembly shown in FIG. 8.

GENERAL ARRANGEMENT

Figure 1:
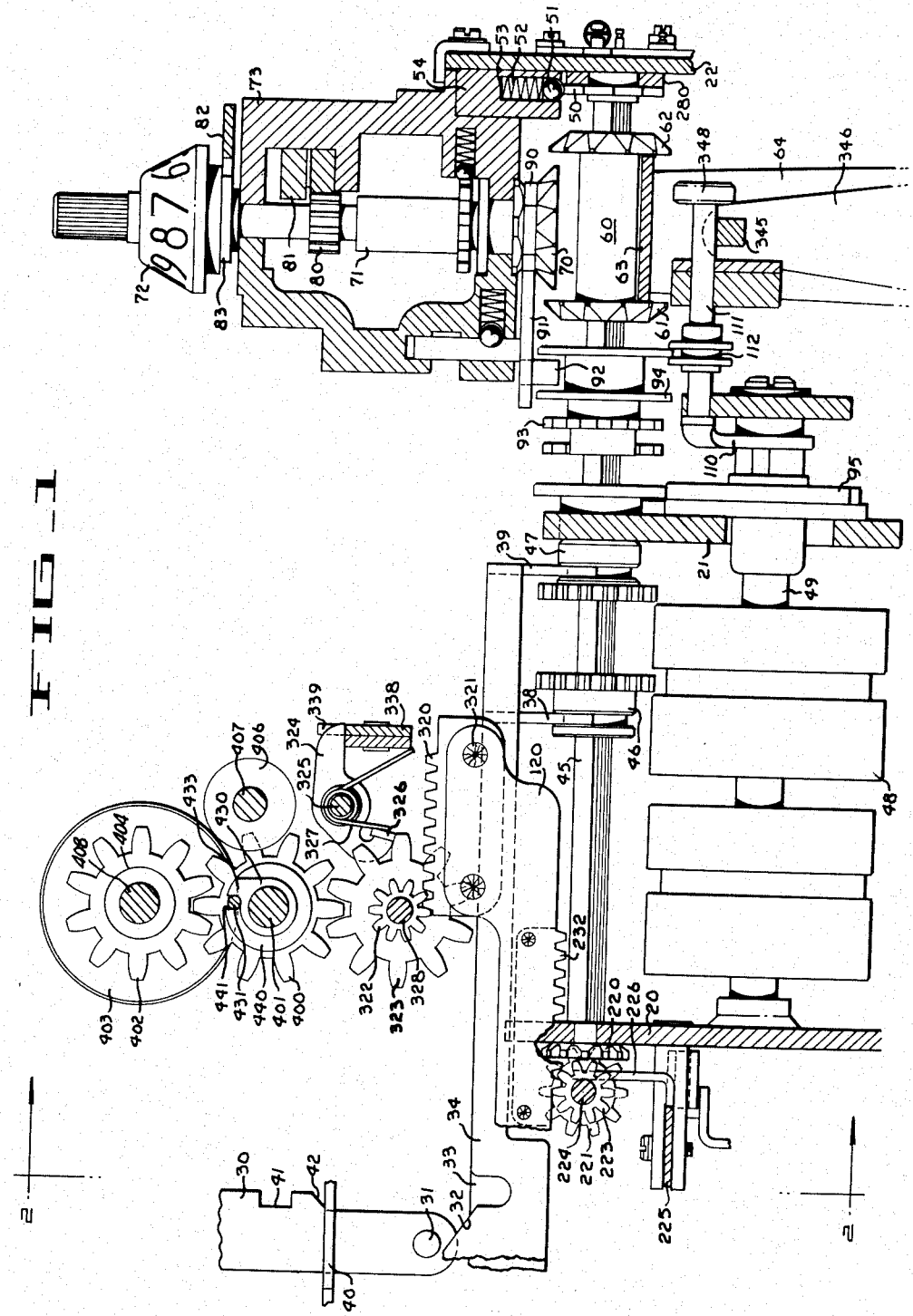
FIG. 1 is a longitudinal cross-sectional view through a portion of the selection mechanism and the register of my invention.

My invention is disclosed as embodied in a calculating machine of the type illustrated in the patent to Friden, No. 2,229,889, issued January 28, 1941. It will be understood that, although the invention is shown as disclosed in connection with this machine, it will be obvious to those skilled in the art that the invention can be adapted for use in other types of calculating machines, and that the invention is not limited to cooperation with the machine shown for exemplification. It can also be mentioned that only so much of the machine as is pertinent to the present invention and its operation, is described and disclosed herein, while all other features (such as the operations counter, the carriage shifting mechanism, the division control mechanism, the multiplier unit, and the like) are omitted for the sake of clarity and brevity.

It will be understood that the mechanisms associated with my invention are supported in a frame of the calculating machine which includes crossbars 20, 21 and 22 (see FIG. 1) on which most of the mechanisms associated with my invention are mounted. The cross pieces, in turn, are supported by frame plates, such as a right-hand frame plate 23 shown in FIGS. 2 and 7, and a left-side frame plate 24 shown in FIG. 2. For the most part the supporting structures are omitted in order to better show the arrangement of the operating parts.

*Selection mechanism.*—It is conventional, particularly in the calculating machine of the patent above-mentioned, to provide a selection mechanism comprising a full keyboard containing a plurality of ordinally arranged rows of keys 30, each row containing a key for each value of "1" to "9," inclusive. The keys 30 are mounted in the machine, by any suitable means, for vertical movement therein and are provided with studs 31 (FIG. 1) adjacent the lower end thereof. These studs are adapted to cooperate with differentially inclined cam faces 32 of selection bars 33 and 34, whereby depression of a value key will translate the associated bar forwardly (to the left in this figure) a differential amount. In the machine preferred for my invention, there are a pair of selection bars 33 and 34 for each order of the keyboard, the selection members, or bars, 33 serving the "1" to "5" keys and the selection bars 34 serving the "6" to "9" keys (see also FIG. 3). Each selection member is mounted for longitudinal translation by means of a pair of parallel levers 35, and each is resiliently biased toward the rear of the machine by a suitable spring 36 or 37, respectively. The rear ends of the selection bars are extended rearwardly and are provided with perpendicularly extending yokes, or shoulders, 38 and 39, respectively. These yokes are adapted to engage annular grooves in selection gears 46 and 47 slidingly but nonrotatably mounted on a square shaft 45, which is journalled in the crossbars, or members, 20, 21 and 22. Depression of a value key 30 will, therefore, through the camming effect of its pin 31 on the associated cam face 32, move the associated members 33 or 34 forwardly a differential amount, against the resilient bias of its spring 36 or 37. Such movement of a selection bar moves the associated selection gear 46 or 47 forwardly on the square shaft 45 a differential amount, corresponding to the value key depressed. Then, when the machine is operated, a series of ordinally arranged actuator shafts 49 are given a full cycle of rotation, whereupon actuator drums 48, which are provided with mutilated teeth (not shown) of differential extension, will engage the one or the other of the selection gears and rotate them an amount determined by the longitudinal position of the operative gears on the shaft 45, as is well-known in the art, and is fully described in the Friden patent above-mentioned.

It is necessary to provide for latching a depressed key stem in its depressed position in order to hold the selection gears 46 or 47 in their differentially adjusted position against the bias of their respective springs 36 or 37. A conventional means is shown in FIG. 1, and comprises a latching slide 40 provided with slotted apertures which embrace the key stems 30 of each order. The latching slides are biased to a forward position (to the left in FIGURE 1) by spring means, not shown. When a key is depressed, a cam 42 thereon engages the rear edge of the slot, camming the latching slide 40 rearwardly. Immediately above the cam 42 is a notch 41 into which the latching slide 40 will be biased by its spring, thereby latching the key 30 in its depressed position. Any key so latched will be held in the depressed position until another key in that order is depressed, thereby operating the latching slide 40 to release any key previously latched in its depressed position; or until operation of a keyboard clear key moves all of the latching slides rearwardly to release all of the keyboard keys, as will hereinafter be described.

It is also necessary to hold the square shaft, and the gears mounted thereon, in an adjusted position against vibration or other causes which might cause slight rotation of the shaft and thereby prevent ready meshing of the various gears when the machine is operated. A conventional detent for this purpose is shown in slightly modified form in FIG. 1. The conventional detent comprises a star wheel 50 rigidly mounted on the square shaft 45. Associated with the star wheel 50 is a spring ball detent comprising a ball 51 mounted in a bore 53 in a bar 54. The ball is resiliently biased into engagement with the star wheel 50 by means of a suitable spring 52 seated in the bore behind the ball 51.

A digitation spool 60 is slidably mounted on the rear end of the square shaft 45 and carries a plus gear 61 and a minus gear 62. The digitation spool can be adjusted longitudinally of the shaft by means of a conventional gate 63 which is mounted on arms 64, and these, in turn, are mounted on a digitation control shaft 65 (FIG. 7). Associated with the digitation control spool 60 is the conventional dial assembly comprising an accumulator gear 70 mounted on the lower end of an accumulator shaft 71. A dial 72 mounted on the top of the shaft 71 carries the numeral values of "0" and "1" to "9," inclusive. It is well known that the dial is operated by shifting the digitation spool 60 rearwardly for addition and forwardly for subtraction to cause the respective gears 61 or 62 to engage the accumulator gear 70, and to then operate the actuators to differentially rotate selection gears 46, 47 and square shaft 45. The dial assembly is conventionally mounted in a frame bar 73 which forms the main support of a shiftable carriage. The shifting of the carriage enables the operator to ordinally align the selection and digitating mechanism with the various orders of the accumulator register dials 72 as required by various arithmetical operations. The means for shifting the carriage is not shown herein, as the mechanism therefor is immaterial to the present invention. Likewise, other elements of the shiftable carriage, such as the operations counter, are omitted for the sake of simplicity.

*Keyboard clearing mechanism.*—It will be recalled that the various key stems 30 are latched in a depressed position by means of the latching slide 40, previously mentioned. It is conventional in machines of this type to provide means for selectively clearing the keyboard by depression of a single key, such as a keyboard clear key 100 (FIGS. 5 and 7) which is mounted on the frame plate 23 for substantially vertical movement, which mounting can be conventional and need not be described. A pin on the lower end of the stem of the key 100 engages a rearwardly extending arm of a bellcrank 101 which is pivotally mounted on the frame plate. The vertically extending arm of the bellcrank engages an ear extending from the front flange of a clearing bail 102 which is pivotally mounted on a transverse shaft 103. The depression of the keyboard clear key will, therefore, rock the bellcrank 101 (clockwise in FIG. 7 and counter-clockwise in FIG. 5) and consequently move the bail 102 rearwardly. The bail 102, upon being thus rocked, engages the forward ends of the latching slides 40, pushing them rearwardly to release all of the depressed key stems 30.

*Register clearing.*—It is conventional in machines of this art, to provide means for clearing the accumulator register, either by manual operation, by a power drive, or automatically in certain programmed operations. It is assumed that the machine of my invention will be provided with a conventional clearing means, such as that shown in the patent above cited. This clearing means may comprise a mutilated gear 80 mounted on each of the accumlator shafts 71. Associated with the mutilated gears 80 (which are arranged in a vertically staggered arrangement on the successive shafts 71) is a clear rack 81 adapted for longitudinal movement in the frame bar 73 (transversely of the machine when viewed from the front). The clear rack is provided with its teeth alternately in the upper and lower face thereof, so as to engage the staggered mutilated clear gears 80, upon operation of the clear rack 81. A zero stop slide 82, conventionally mounted on the upper surface of the frame bar 73, is operated simultaneously with the operation of the clear racks 81. These stop slides can be mounted by any suitable means, such as the conventional pin-and-slot arrangement, not shown, and operated by conventional means. Associated with the zero stop slides 82 is a zero stop cam 83, one mounted on each of the accumulator shafts 71. The zero stop slide 82 is shifted with the beginning of operation of the clearing rack 81, so that a finger thereon is translated into the path of travel of the zero stop shoulder of the stop cam 83 to provide positive stopping of the dial assembly when the dial is returned to the "0" position.

*Tens-transfer mechanism.*—It is necessary, in any calculating machine, to provide means for effecting a tens transfer between the orders of the register, and I show the conventional tens-transfer mechanism of the patent above-referred to. Briefly, this tens-transfer mechanism comprises a single tooth transfer cam 90 on each dial shaft 71, preferably located on the shaft immediately above the accumulator gear 70. Associated with the cam, and adapted to be rocked by it, is a transfer lever 91 which is journalled in the frame bar 73 and which carries a perpendicular ear 92 in a plane adjacent the next higher order square shaft 45. Each square shaft 45 carries thereon a tens-transfer gear 93 provided with flanges 94, the latter cooperating with the ear 92 to shift the transfer gear longitudinally of the square shaft 45. Thus, whenever the dial shaft of one order rotates through the "9" to "0" position, the cam 90 thereon rocks the transfer bellcrank, or lever, 91, and the rocking of this lever causes the ear 92 thereon to push the flange 94 and gear 93 of the adjacent higher order forwardly (to the left in FIG. 1) on its square shaft 45. In the forward position caused by the tens-transfer, the gear 93 is engaged by a single tooth tens-transfer gear 95 mounted on the actuator drive shaft 49, thereby rotating the square shaft of the higher order an additional increment of motion. Such additional rotation, through the digitation control spool 60, enters an additional value, additively or subtractively, into the dials 72 of the higher order.

The various tens-transfer gears 93 are restored to the inoperative position shown at the end of each cycle of operation. In the machine of the patent mentioned, this restoration is provided by means of a restore cam 110 carried by the actuator shafts 49. This cam engages a restoring pin 111 which is provided with a pair of flanges 112 embracing one of the flanges 94 of the tens-transfer gear. It is obvious that the restore pin 111 is moved forwardly, along with the forward translation of the tens-transfer gear 93, whenever a tens-transfer lever 91 of the next lower order is operated, and that the restoration of the pin 111 to the rear will simultaneously restore the tens-transfer gear 93 to the position shown.

BACK-TRANSFER MECHANISM

Mechanisms for the transfer of values standing in the register into the selection mechanism are often referred to as "back-transfer" mechanisms. Generally these mechanisms fall into two broad classes: (1) those in which a value is cleared from the register and is transferred into the selection mechanism, or a storage mechanism, by the return of the register dials to their "0" position; and (2) those in which is value standing in the register is sensed and a mechanism operated under the control of the sensing mechanism to set a value in the selection mechanism corresponding to that shown in the register, without clearing the register. The present invention deals with an improved mechanism for effecting the back-transfer operation by the first of these general classes. In the present instance, the digitation control shaft 65 is rocked to cause the engagement of the minus gear 62 with the accumulator gear 70, so that if the gear 70 is returned to its "0" position, it will rotate the square shaft 45 a number of increments of motion determined by the value standing in the associated register dial, and this differential rotation of the square shafts 45 is utilized to set the back-transfer mechanism differentially.

It is conventional in back-transfer mechanisms of this type to utilize the regular clearing or zeroizing mechanism to return the registers to their "0" position, where the dials are blocked in the conventional manner by the zero stop slide 82. This type of mechanism can be utilized with other elements of my invention, but it requires considerable strengthening of the clear racks 81 and the mutilated clear gears 80, as the rotation of the square shaft 45, and the various gears mounted thereon, together with the driving of the transfer mechanism itself, causes a rapid movement of a mass much greater than the dial assembly. Such mechanisms, involving as they do considerable mass and consequent inertia, require considerable power as compared to conventional clearing. A major feature of the present invention lies in a new and more efficient means for driving the transfer mechanism. While I recognize that the back-transfer mechanism could be set by utilizing the conventional clearing mechanism, I prefer to use the embodiment shown herein and which will be described hereafter under the heading "Transfer Drive Mechanism." For the moment, however, it can be noted that, in effect, I "pull" the value out of the register dials by directly and resiliently driving the back-transfer mechanisms until motion is blocked by the register dials 72, either by the engagement of the zero stop cam 83 on the shaft thereof with the stop shoulders carried by the stop slide 82, or by blocking the transfer gears 93 against movement thereof (which, in turn, blocks rocking of the transfer bellcrank 91 and thus prevents rotation of the cam 90 beyond the position of engagement therewith) to stop the dial in the "0" position. The latter method of blocking passage of the dial beyond the "0" position, is preferred as the mechanism therefor is considerably simpler in view of the fact that the transfer gears are mounted in the frame of the machine whereas the dial shafts are within the shiftable carriage.

Various methods could be suggested for "pulling" the value out of the accumulator dials by operating the back-transfer mechanism, but I prefer to utilize the auxiliary selection members shown in my joint Patent No. 2,736,494, above referred to, for a machine for the automatic extraction of square root, as will be evident to those familiar with the "Friden" calculating machine for such extraction.

*Auxiliary selection members.*—In the preferred form of my invention, I provide an auxiliary slide 120 associated with the pair of selection slides 33 and 34 of each order of the machine. In the form shown in the drawings, and especially in FIGS. 1, 2 and 3, the auxiliary slides 120 are slidably mounted in slots, not shown, in the crossbar member 20 and a comb, not shown, at the forward part of the selection mechanism. These slides are resiliently biased toward the rear, preferably by a spring 121 (see FIG. 3) tensioned between a stud 122 on the forward end of each slide and a cross-member, not shown. In the position shown in these figures, the auxiliary slides 120 are in their inoperative, or retracted, positions, which is the normal position of these members due to the bias of their springs 121. Each of these auxiliary members 120 is provided with a projecting bracket 123 which passes through notches 124 and 125 formed in the lower edges of the selection bars 34 and 33, respectively. It will be recalled that the selection bar 33 serves the "1" to "5" keys of the order and selection bar 34 serves the "6" to "9" keys. In such a machine, the forward movement of the auxiliary member 120 will resiliently move the "1" to "5" selection bar forwardly through its five differential positions before engaging the "6" to "9" bar 34, after which the "1" to "5" bar 33 will remain stationary while the "6" to "9" bar 34 moves. This can best be accomplished by means of a small slide 126 mounted on the left-hand side of the selection bar 33 by suitable pin-and-slot connections 127, as shown in FIG. 3. The slide 126 is biased to its retracted position shown by a suitable tension spring 128. Thus the movement of the auxiliary slide 120, through the bracket 123, will directly move the second slide 126. The force of spring 128 is sufficient to cause the selection member 33 to follow the movement of slide 126, whereby the movement of auxiliary slide 120 will differentially position the selection slide 33 in a corresponding position, until the "5" position is reached (in which event the forward end of the bar 33 abuts against a cross-member in the machine). Thereafter the spring 128 will yield, permitting auxiliary slides 120 and 126 to move without changing the setting of selection member 33. At the time the auxiliary slide 120 reaches the "5" position the bracket 123 will have engaged the forward part of the notch 124 on the selection bar 34, so that thereafter movement of the auxiliary slide 120 will cause direct movement of the bar 34 to a corresponding position.

*Selection slide feed.*—The mechanism for translating the slides forwardly to a differential position determined by the blocking of rotation of the register dials 72 against movement beyond the "0" position is best shown in FIG. 6. The feed mechanism is driven by rotation of a power shaft 135 which (as shown in FIG. 7) is driven from the armature shaft 136 of a motor, not shown. A drive gear 137 on the shaft 136 meshes with a clutch gear 138, which forms the driving portion of a unidirectional clutch 139. It can be mentioned here that in the preferred form of my invention, the clutch 139 is used only for transfer operations, and is separate and distinct from the conventional clutch (not shown) which controls operation of the actuator shafts 49. The driven side of the clutch also comprises a large gear 140. The two gears 138 and 140 can be selectively connected by means of a clutch dog 141, the position of which is controlled by a clutch lever 142. The driven clutch gear 140 meshes with a large gear 143 mounted on the right end of the drive shaft 135.

Referring now to FIG. 6, it will be seen that the drive shaft 135 carries, adjacent the left end thereof, a cam 150. A cam follower arm 151 is associated with the cam 150, being pivotally mounted on the adjacent frame plate by any suitable means such as stud 149. The free end of the arm 151 carries a roller 152 which engages the periphery of the cam 150. As shown in FIG. 6, the cam has a low dwell for nearly 75 degrees of rotation of the drive shaft 135, and thereafter builds up to a high point approximately 150 degrees from the end of the dwell, after which its drops back to the low point at the full-cycle position. Thus the follower arm 151 remains substantially stationary for approximately the first 75 degrees of rotation of the drive shaft 135 (during which time certain interponent gearing is set to its operative position as will hereafter be described). After this period of the 75 degree dwell, the arm 151 is oscillated (first clockwise in FIG. 6).

The follower arm 151 carries a link 153 pivotally mounted thereon by any suitable means, such as stud 154. The forward end of the link 153 is pivotally mounted on a long pin 157 carried by arm 155. The arm 155 is rigidly secured to a transverse shaft 156. A tension spring 158 tensioned between the outer end of the pivot stud 149 and the pin 157, resiliently biases the follower arm 151 against the cam 150 and holds the link and arm 155 in a retracted position (counter-clockwise as shown in FIG. 6).

The transverse shaft 156 extends entirely across the keyboard and is provided with a plurality of ordinally arranged operating arms 165 rigidly secured thereto (only one such arm shown in FIG. 6). These arms 165, one for each of the orders of the machine, are in planes adjacent the respective auxiliary slides 120. The free ends of the operating arms 165 engage a pin 166 riveted, or otherwise rigidly secured, to a slide member 167 resiliently mounted on the auxiliary slides 120. Each slide 167 is mounted for longitudinal motion on the associated auxiliary slide 120 by means of a pin-and-slot connection comprising slots 168 in the slide 167 embracing pins 169 carried by the auxiliary member 120 (see FIG. 3). A spring 170, tensioned between a pin 172 on the auxiliary member 120 and a stud 171 on the side 167, resiliently biases the slide 120 to follow the movement of the slide 167.

It will be obvious that the cam follower assembly including the arms 151, shaft 156 and operating arm 165 travel through a path of invariable magnitude with each cycle of the back-transfer mechanism. Normally the auxiliary members 120 will attempt to follow the motion of the slide 167, through the spring connection 170. However, whenever the movement of the auxiliary member 120 is blocked (by the blocking of the tens-transfer mechanism as hereinafter described) the connection will yield.

*Back-transfer control.*—The operation of the clutch 139, and consequently the shaft 135, is under the control of any conventional manipulative member, for example, a back-transfer control key 180 (FIG. 7). The control key 180 is mounted for substantially vertical movement on the frame plate 23 by any conventional means, such as slots 181 in the key stem embracing pins 182 carried by the frame plate. The key is normally biased to its raised position by a suitable spring 183. A pin 184 riveted, or otherwise rigidly mounted, on the control key 180 engages the upper edge of one arm of a bellcrank member 185. The bellcrank 185 is pivotally mounted on the frame plate 23 by any suitable means, such as a screw stud 186, and is biased to its raised position by a conventional spring 187. A long link 188 connects the lower arm of the bellcrank 185 with the clutch control lever 142, as shown, whereby depression of the key 180 rocks the clutch control lever 142 to engaging position and thus enables the engagement of the clutch members.

A second link 189 connects the clutch control lever 142 with a switch control lever 190 to control closing of a motor switch, not shown. Thus, the depression of the key 180 closes the motor switch to operate the motor and simultaneously rocks the clutch control lever 142 to clutch-engaging position, so that the clutch is engaged and the motor drives the drive shaft 135.

I prefer to provide an interlock between the keyboard clear key 100 and the back-transfer key 180 in order to prevent operation of the latter unless the keyboard has been cleared of any values standing therein. It will be obvious to those skilled in the art that it would be possible to provide, alternatively, for the depression of the transfer key 180 first clearing the keyboard. It seems simpler, and therefore preferable, to prevent depression of the back-transfer key 180 if a value stands in the keyboard, so that the back-transfer key cannot be operated unless and until the keyboard clear key has first been operated to release all of the value keys 30. It will be obvious that if some such interlock were not provided an operator might operate the back-transfer mechanism while a value stood therein, thereby securing an erroneous setting of the back-transfer mechanism or jamming the machine.

A three-armed latch lever 200 is rotatably mounted on the frame plate 23 by any suitable means, such as screw stud 201, in a plane between the keyboard clear key 100 and the back-transfer key 180. The lower arm of the latch lever 200 carries a shoulder 202 which underlies a pin 203 on the back-transfer key stem 180. Thus, when the latch arm is in the position shown in FIG. 7, depression of the key stem 180 is blocked by the shoulder 202. The latch arm 200 is rocked to disengaging, or unblocking, position (clockwise from the position shown in FIG. 7) by depression of the clear key 100. It will be recalled that the depression of the clear key 100 causes the rocking of the bellcrank 101 (clockwise in FIG. 7). This movement of the bellcrank causes a pin 199 on the upper end of the vertical arm of the bellcrank 101 to engage a cam surface 204 on the lower edge of the forwardly extending portion of arm 200, thereby rocking the latch to its disengaging position.

The latch 200 is itself latched in its disengaged position, as by means of a latch arm 205 keyed to, or otherwise rigidly mounted on, the outer end of a short shaft 206 journalled in the frame plate, as shown. The inner end of the shaft is journalled in an auxiliary plate, not shown, and the assembly of arm 205 and shaft 206 is biased to a latch-engaging position by a suitable spring 207. The lower end of the arm 205 is provided with a latching shoulder 208 which is adapted to engage a pin 209 in a rearwardly extending arm, or projection, of the latch 200. Thus, as the latch 200 is rocked (clockwise in FIG. 7) by the depression of the keyboard clear key, the pin 209 on the rearwardly extending arm of the latch rocks below the latching shoulder 208, permitting the latch arm 205 to rock (counter-clockwise in FIG. 7) to its latching position. The secondary latch 205 is released by translation of a latch-releasing link 210, the forward end of which is provided with a slot 211 embracing a pin 212 on the latch arm 205. The operation of the link, and its time in the cycle of operation, will be explained hereafter.

It can be noted at this point that the latch 205 is moved to a releasing position by any machine operation initiated by the conventional calculating machine apparatus. The conventional mechanism, as shown particularly in FIG. 3 of the Patent No. 2,736,494 above-referred to, includes a link 310 (see FIG. 7) which is translated rearwardly with every operation of the conventional clutch mechanism (not shown herein) or the conventional switch control link (likewise not shown herein), both of which are shown and described in the patent referred to. As shown in FIG. 7, this link 310, in the present invention, is provided with an offset, forwardly extending portion 309, the forward end of which is provided with a slot 308. The slot 308 embraces a pin 307 mounted on the upper end of an arm 306 likewise keyed to, or otherwise rigidly mounted on, the shaft 206; whereby the rearward translation of the link 310 will also rock the assembly comprising the shaft 206 and the latch arm 205.

*Back-transfer interponent gearing.*—In order to pull the value out of the register dials 72, by operation of the apxiliary slides 120, as previously explained, it is necessary to provide interponent gearing to connect the dial shaft to the auxiliary member 120. Obviously, the most convenient means of effecting this connection is through the digitation control spools 60 and square shafts 45 which are already located in the machine. It is obvious that an independent transfer means could be utilized, but because of the crowded space in calculating machines it is desirable to use old and conventional parts as much as possible. I therefore provide a miter gear 220 rigidly mounted on the forward end of each square shaft 45. These gears 220 are normally disengaged from, but are adapted to be engaged with complementary miter gears 221 (see FIGS. 1 and 2). The gears 221 are provided with a long collar 222 (as shown in FIG. 2) on the right-hand end of which is a pinion 223, the two gears 221 and 223 and the integral collar 222 forming an interponent spool adapted to connect the miter gears 220 and the ordinally related auxiliary slides 120. The spool gears 221, 223 are ordinally disposed along a transverse shaft 224 mounted in brackets, not shown, on the forward face of the transverse member, or crossbar, 20. The gears 223, when the spools are shifted to the right to mesh gears 220 and 221, mesh with racks 232 mounted on the lower edge of auxiliary slides 120. Thus, when the interponent spools are shifted to their operative position (to the right from the position shown in FIG. 2), they operatively connect square shafts 45 to auxiliary slides 120, so that rotation of the former causes forward translation of the latter.

These spool gears 221, 223 are both rotatably and slidably mounted on the shaft 224, and are adapted to be moved axially along the shaft 224 by means of a comb 225 provided with ordinally arranged tongues 226 which lie between the two gears 221 and 223. Movement of the comb is thus able to shift the gear spools 221, 223 axially along the shaft 224, whereby the gears 221 may engage the gears 220. Normally the comb 225 is biased to the left by a spring 227 (shown in FIG. 6) tensioned between a seat in an ear 228 formed on the comb 225 and the frame plate, not shown. In this position the gears 221 are removed from the gears 220. However, the comb 225 is adapted to be shifted to the right, to cause the gears 221 to engage gears 220 by means of a pin 229 on a shifting arm 230 engaging a cam face 231 formed on the comb 225.

Shifting arm 230 is operated, in the first few degrees of rotation of drive shaft 135, in a back-transfer operation, by means which will now be described. The right end of the drive shaft 135 carries a cam 240 (see FIG. 7) rigidly mounted thereon. The cam is provided with a single depression 241, the side of which rises sharply for about 30 degrees on either side of the depression, the balance of the cam being substantially concentric with the shaft 135. A follower arm 242 is associated with the cam 240, being pivoted on the frame plate 23 by any suitable means, such as screw stud 243. The follower arm 242 carries a roller 244 adapted to engage the periphery of the cam 240. It is obvious, therefore, that the follower arm 242 will be rocked sharply, at the start of a cycle of operation, after which it will remain stationary until immediately prior to the termination of the cycle. The upper end of the follower arm 242 carries a floating link 245 which is pivotally mounted thereon by a suitable means, such as a screw stud 246. The forward end of the floating link 245 is resiliently lifted by a suitable spring 248 tensioned between the link and a stud 249 on the frame plate.

The end of the floating link 245 is preferably shaped to form a shoulder 260, as shown. Associated with the end, or shoulder, is a pin 261 carried by the upper end of an arm 262 (see FIG. 6) which is pivotally mounted on any suitable means, such as a transverse shaft 263. A link 264 connects the arm 262 to a second arm 265, being pivotally mounted on the two arms by suitable studs 266, 267. The second arm 265 is rigidly secured to a transverse shaft 268 which extends across the keyboard of the machine. The left end of the shaft 268 carries a bellcrank 269 rigidly mounted thereon. One arm of the bellcrank 269 pivotally supports a rearwardly extending link 270 which is mounted thereon by a suitable stud 272. The link 270 abuts against the camming arm 230, the rearward motion of which is effective to cam the comb 225 to the right to its operative position. A spring 271 tensioned between the second arm of the bellcrank 269 and the link 270, biases the bellcrank, and the assembly connected therewith, to an inoperative position (rotating the crank and shaft clockwise in FIG. 6).

It will be obvious that the translation of the floating link 245 by operation of the cam 240 is operative, among other things, to engage the pin 261, thus rocking arms 262 and 265 and rotating the shaft 268 (counter-clockwise in FIG. 6). The rotation of the shaft 268 is utilized to translate the link 270 and arm 230 rearwardly, thus camming the comb 225 to its operative position, to the right in FIG. 6. Such motion of the comb 225 causes the miter gears 221 to engage the miter gears 220 which are mounted on the forward end of the square shafts, so that the operation of the auxiliary members 120 will pull the value out of the register until the individual dials are stopped in their "0" positions.

The floating link 245 is provided with a second shoulder 247 (see particularly FIG. 7). The shoulder 247 is adapted to engage a pin 250 when the link is in its elevated position, which pin is riveted on, or otherwise rigidly secured to, the forward end of the conventional plus-minus slide 251 of the machine of the patent above-described. The plus-minus slide 251, in turn, is pivotally mounted on an arm 252 rigidly secured to the digitation control shaft 65. Thus, in normal operating conditions, the rocking of the follower arm 242 causes the shoulder 247 to engage the pin 250 and thereafter translate the digitation, or plus-minus, bar 251 forwardly, rocking shaft 65 and causing the minus gears 62 to mesh with the accumulator gears 70. Thus the rotation of the drive shaft 135 and cam 240, within the first few degrees of rotation, translate the digitation control bar 251 forwardly to cause engagement of the accumulator dials with the square shaft 45, through the minus gear 62.

The forward translation of the floating link 245 is operative, when the link is in its raised, or effective, position, to set both the comb 225 to a position to cause meshing of the gears 221 and 220, and the digitation control spools 60 to connect the minus gears 62 to the accumulator gears 70. This meshing of the gears 62 and 70 and the shifting of comb 225 occurs prior to the rocking of the follower arm 151 controlled by the drive cam 150, previously described. Therefore, the first portion of the transfer cycle is utilized to operatively connect the register dials 72 to the auxiliary slides 120, after which the cam 150 causes resilient operation of the auxiliary slides 120 to pull the value out of the register and set the auxiliary slides to differential positions representative of such value. It will be recalled that secondary members 167 move through a path of constant length and resiliently bias the auxiliary slides 120 to positions determined by the blocking of a tens-transfer element between the various orders, and the slides, in turn, position selection bars 33, 34.

The auxiliary slides 120 can be latched in their adjusted positions by any suitable latching means, but a preferred form is shown in FIG. 1. This form comprises the detents shown and described in my joint Patent No. 2,736,494 for the extraction of square root previously mentioned, and comprises a rack 320 mounted on each auxiliary slide 120 by any suitable means, such as rivets 321. The teeth of rack 320 mesh with a gear 322 which is formed integrally with a larger gear 323, the integral gears 322, 323 being rotatably mounted on a transverse shaft 328. A detent bellcrank 324 is associated with the larger gear 323, being pivotally mounted on a suitable shaft 325, and carrying an ear 326 which is so positioned as to be cammed out of mesh with the gear when the gear rotates in a clockwise direction (when viewed from the right as in FIG. 1), but to block rotation of the gear in the opposite direction. The bellcrank is resiliently biased into engagement with gear 323 by a torsion spring 327. By this means the forward movement of slide 120 rotates gears 323 (clockwise in FIG. 1), camming the detent arm 324 (counter-clockwise in this figure) against the bias of its spring 327. However, as soon as the differential position of slide 120 has been reached, return movement is blocked by the detent ear 326.

*Auxiliary slide release.*—The detents 324 can be released by any suitable manually controlled means, preferably the keyboard clear key 100. In this connection, I prefer to use the clearing mechanism shown in the square root patent above-mentioned, which mechanism is shown in FIG. 5. The depression of the clear key 100, operating through bellcrank 101 and clear bail 102, rocks lever 330, the lower end of which is provided with a pin 331 engaging the clearing bail 102. The lever 330 is mounted on a suitable bracket, or frame plate, not shown, by any suitable means, such as screw stud 332. The upper end of the lever 330 supports the forward end of a link 333, while the rear end can be supported by any suitable means, such as a slot 334 engaging a transverse shaft 335. The rear end of the link 333 carries a roller 336 mounted on a bracket extending laterally from the link, which roller engages a cam end 337 of a clear slide 338. The depression of the keyboard clear key is effective, through the linkage just described, to translate the clear slide 338 (to the left when viewed from the front of the machine). The clear slide 338 (shown also in FIGS. 1 and 2) underlies the tails of the detent latches 324, as shown in FIG. 1. The slide 338, as shown in FIG. 2, is provided with an ordinally arranged series of cam ears 339, the sloping edges of which engage the tails of the latches 324. The translation of the clear slide 338 (to the left in FIG. 2) cams the tails of the latches 324 upwardly (counter-clockwise in FIG. 1), whereupon the latch ears 326 move out of the path of the teeth of gears 323, releasing the gears and the associated auxiliary slides 120 to the bias of springs 121 which urge the slides to the rear. Thus the slides are enabled to return to their "0," or inoperative, position by operation of the clearing bail 102, either by manual operation of clear key 100 or by automatic means, not shown.

*Zero stop.*—It will be obvious that it is essential in the process of my invention to stop the register dials 72 in their "0" position. It was indicated above that this could be secured by operating the conventional zero stop slide 82. The mechanism for such an operation is rather complicated as the control therefor comes from the fixed portion of the machine, while the slide is carried by the shiftable carriage. It is simpler to block the register dials 72 in their "0" position by blocking operation of the conventional tens-transfer mechanisms, which must operate whenever the register dial with which it is associated passes from the "0" to its "9" position. For this reason I prefer to utilize the second method, and therefore show this mechanism as a preferred form of my invention, which is illustrated particularly in FIGS. 1 and 7.

This mechanism involves a blocking bail which is adapted, when operated, to block axial translation of the tens-transfer gears in the machine. Obviously the blocking of the forward translation of the tens-transfer gears 93, prevents rocking of the tens-transfer arms 91, the ends of which engage the tens-transfer cam 90, thereby stopping the dial in its "0" position. A simple form of such structure is shown in FIG. 1 and comprises a bail, or gate, 345. This bail 345 is mounted on a pair of arms 346, which, in turn, are rigidly mounted on a sleeve 347 rotatably mounted on the shaft 65. The bail 345 is adapted to engage the enlarged heads 348 of the detent pins 111, which, in my invention, are extended rearwardly to accommodate the head and bail. In the normal position of the bail 345, the detent pin 111 is free to move forwardly, as is conventional, whenever the tens-transfer gear 93 is moved forwardly to its operative position. However, when the bail 345 is rocked (clockwise in FIG. 1), the bail 345 engages the head 348 and thereby blocks movement of the pin 111. As indicated above, this blocking of movement of pin 111 prevents operation of the tens-transfer gear and that, in turn, prevents rotation of the dial shaft 71 beyond its "0" position.

The means for operating the bail 345 is shown particularly in FIG. 7, and comprises a link 350, the forward end of which is mounted on the pin 246 carried by the follower arm 242, and the rear end of which is supported by an arm 351 rigidly mounted on the sleeve 347. It will be recalled that the follower arm 242 is rocked sharply within the first few degrees of each cycle of operation, and prior to rocking of the cam follower arm 151 which operates the auxiliary slides. The rocking of the follower arm 242, therefore, among other things, rocks the arm 351 (clockwise in FIG. 7) to rock the bail assembly including the bar 345 and thus lock the tens-transfer mechanism against operation.

*Releasing detent.*—It is conventional in machines of this kind to detent the register dials and the square shafts 45 in their differentially adjusted positions in order to prevent vibration, or the like, from moving them. It is obvious that if the gears were able to rock slightly, it would be impossible to cause them to mesh during digitation, thus damaging the machine as well as giving inaccurate results. As a practical matter, the detent on the square shaft 45 is much stronger than that on the related dial shaft, as the mass of the square shaft and its associated gears is considerably more than the mass of the dial shafts 71 and their related parts. It will be obvious that these detents constitute an appreciable load on the mechanism if they are operated simultaneously (as they are in mechanisms of this kind, as several orders must be considered). I therefore prefer to provide means for releasing these detents substantially simultaneously with the engagement of the gears 220 and 221 and gears 70 and 62. As a practical matter, I have found it sufficient to release the detents on the square shafts 45 as they constitute the greater load on the mechanism. However, it will be understood that if desired, the detents associated with the dial shafts 71 could be similarly released. A preferred mechanism for this purpose will now be described.

Spring ball detents are commonly used in connection with these parts, as they take little space, are easy to assemble, are made from inexpensive parts, and are extremely efficient. In connection with my invention, they have the further advantage that they are extremely easy to disable so that the parts detented are released for free movement. The means for so releasing the detents is shown particularly in FIGS. 1 and 4. The preferred means comprises a cam slide 280 mounted between the rear crossframe 22 and the adjacent detent wheels 50. The slide is provided with a number of ordinally arranged slots 281 which embrace the rounded bearing portion of the square shafts 45, as shown in FIG. 4. The slide 280 is resiliently biased to the left by a spring 283 tensioned between a pin, or stud, 284 carried by the slide 280 and a stud, not shown, on the cross-member 22. This slide is provided with a number of cam projections 282 which, in the normal position of the parts, abut against the detent bar 54. These cam projections, or noses, normally lie to one side of the balls 51 of the detent so as to not interfere with their normal operation. However, a slight motion of the cam slide 280 (to the right in FIG. 4), against the bias of its spring 283, causes the camming projections to engage the balls 51 and cam them into a retracted position against the bias of their individual springs 52, thereby lifting the balls 51 out of engagement with the star wheel, or detents, 50. The motion of the slide 280 can be secured by power from the drive shaft 135 timed to occur immediately prior to the rocking of the feed arm 151, but subsequent to the engagement of the transfer gears 221 and 220 and operation of the digitation control shaft 65 to cause the minus gears 62 to mesh with the accumulator gears 70, as will now be explained.

One of the simplest methods of operating the cam slide 280 is shown in FIGS. 4 and 6, and comprises a pin 290 carried by the right-hand end of the cam bar 280, which pin projects through a slot 291 in the rear cross-member 22. The pin is engaged by a cam face 303 formed on a bar 292 slidably mounted on the rear of the plate 22 and normally held in a lower, or retracted, position by a suitable spring, not shown. The bar 292 is provided at its lower end with a pin 293 which engages a pin 294 carried by an arm 295 rigidly mounted on a transverse shaft 296. The shaft 296 extends to the left side of the machine where it is provided with an arm 297. The arm 297 is connected by means of a link 298 to a follower arm 299 (see also FIG. 6) which is pivotally mounted on the left frame plate by any suitable means, such as shaft 300. The upper end of the follower arm 299 carries a roller 301 which engages the edge of a cam 302 mounted on the power-driven drive shaft 135. The cam is formed with a low at the full-cycle position followed by an abrupt rise to a high point which is concentric with the shaft 135 through the major portion of the machine cycle. Thus, the cam 302 rocks arm 299 sharply at the start of a cycle of back-transfer operation, and has rocked the follower arm 299 to its fully rocked position prior to the time that the cam 150 rocks follower 151 to move the auxiliary slides 167. The rocking of the follower arm 299, through link 298 and arm 297, rocks shaft 296, whereupon arm 295 lifts the cam member 292. The lifting of cam member 292 causes the cam face 303 thereon to engage the pin 290 on the slide 280, camming the slide 280 to the right to cause the cam noses 282 thereon to engage the balls 50 and force them to a retractive, or inoperative, position. This operation is timed, preferably, to fall between the operation of the follower arm 242 (FIG. 7) and floating link 245 (which are operative to cause the minus gear 62 to engage the accumulator gear 70, through the operation of digitation control link 251, and to cause engagement of the transfer gears 221 and 220 through the operation of arm 262 (FIG. 6), shaft 268, cam member 230 and comb 225), and the operation of the auxiliary feed mechanism which is activated by cam 150. By this means the accumulator dials 72 are first connected to the square shafts 45, and the square shafts 45 are connected to the auxiliary feed gears 221, 223; then the detents 50, 51 are released; and finally, the cam 150 rocks the feed arm 151 to move the auxiliary slides to their full positions. Following the operation of the feed slides by the cam 150, the cam 302 reaches the end of its high point, thereby permitting the retraction of arm 299 and cam slide 280 to again cause the detents to become operative, and finally, the cam 240 permits the retraction of floating link 245 to cause disengagement of the gears 62, 70 and 220, 221. The cycle is then completed and the transfer will have taken place.

*Release of back-transfer key latch.*—It was mentioned previously that the back-transfer key 180 is normally latched against depression by means of the latch member 200, and particularly the shoulder 202 on the lower arm thereof which engages the pin 203 on key 180. This latch member is rocked (clockwise in FIG. 7) whenever the clear key 100 is depressed, and is latched in the rocked position by means of the latching arm 205. This latch is rocked to releasing position by any cycling of the machine, either by conventional operation by means of the link 310 and arm 306, previously mentioned, or by means of link 210 which connects the latch 205 to the floating link 245. It is seen in FIG. 7 that this link is pivotally supported upon the floating link by means of a pin, and that the front end is supported on the latch by means of the pin-and-slot connection 212, 211. Thus, the link is translated with the reciprocation of a floating link 245, regardless of whether that link is in its normal raised position or in its inoperative lowered position. Thus, every cycling of the machine caused by depression of the transfer key 180 will be effective to rock the latch 205 to its disengaging position and thereby re-enable the latching of the back-transfer key 180 by latch member 200.

*Operation of back-transfer mechanism.*—It is believed that the operation of the back-transfer mechanism will be obvious from the preceding description, but it will be briefly summarized. Normally the depression of the back-transfer control key 180 is blocked by means of the latch 200 (FIG. 7), which latch is released by the depression of the keyboard clear key. It is believed obvious that the keyboard should be cleared before trying to effect a transfer of values from the register into the back-transfer mechanism. The depression of the back-transfer control key 180 rocks bellcrank 185, pushing link 188 rearwardly to operate the clutch control lever 142 and the switch control lever 190. As indicated above, the clutch 139 utilized in the preferred form of my back-transfer mechanism, is distinct from the conventional drive clutch which controls the driving of the main drive shaft and the actuators, the clutch 139 being used only for the back-transfer mechanism. The operation of clutch control lever 142 permits engagement of the clutch, which then drives gear 143 and cam 240. The cam 240 rocks the follower arm 242 sharply within the first few degrees of rotation, thereby translating the floating link 245 forwardly to its fully extended position. Such movement of the floating link 245 causes operation of the digitation control 251, which, through arm 252, rocks the digitation control shaft 65. Such rocking of the shaft (counter-clockwise in FIGS. 1 and 7) causes the minus gears 62 to mesh with the accumulator gears 70. Substantially simultaneously with the operation of digitation control bar 251, the forward end of floating link 245 engages pin 261 on arm 262 (FIG. 6), thereby camming the comb 225 to the right to cause the miter gears 221 to mesh with the complementary gears 220 mounted on the square shaft 45. In this manner, in the first few degrees of rotation of the drive shaft 135, the accumulator dials 72 are connected with the ordinally related auxiliary slides 120. The rocking of follower arm 242 (FIG. 7), through link 350 and arm 351, rocks the zero stop bail 345 (clockwise in FIG. 1) to block the operation of the tens-transfer mechanism, and thus prevent rotation of the dials 72 beyond their "0" positions.

Immediately after the rocking of the follower arm 242, the cam 302 (FIG. 6) on the left end of the drive shaft 135 rocks its follower arm 299. Thereupon link 298 rocks the shaft 296, which is effective, through cam member 292, to shift the detent release slide 280 to the right. Such shifting of the slide causes the cam noses 282 thereon to engage the balls 51, forcing them into a retracted position, i.e., disengaged from their respective star wheels 50. This operation is, of course, not necessary but it is a convenient means of relieving the load on the transfer mechanism by disengaging the more powerful detents.

Following these two preliminary operations which occur in the first few degrees of rotation of drive shaft 135, the cam 150 rocks the arm 151, which, through the linkage shown in FIG. 6, rocks the ordinally arranged arms 165. These arms, it will be recalled, engage pins 166 on the yieldable slides 167 mounted on the auxiliary slides 120. Obviously, the rocking of the shaft 156 and the arms 165 mounted thereon, reciprocates the yieldable slides 167 through paths of constant magnitude. Such reciprocation of yieldable slides 167 resiliently biases the auxiliary slides 120 forwardly, from the force of the individual springs 170 which connect the yieldable slides 167 and the auxiliary members 120, the slides 120 moving forward until the ordinally related dials 72 reach the "0" position. The blocking of the operation of the tens-transfer mechanism thereupon prevents the various dials 72 from going beyond their "0" position, so that the dials are positively stopped in the "0" position. Such blocking of the respective dials in their "0" positions, prevents further translation of the ordinally related auxiliary slide—the slide having moved forwardly a differential amount corresponding to the value previously standing in the dial. At this point, the springs 170 connecting the auxiliary slides to the yieldable members 167 thereupon yield.

The auixiliary slides 120 have been latched in their adjusted positions by the detents 324 previously described, so that they remain latched in their adjusted positions. In such positions they hold their associated selection slides 33 and 34 in a differential position representative of the value formerly standing in the register dials. This factor can then be used in further computations.

FACTOR STORAGE MECHANISM

The back-transfer mechanism heretofore described is complete in itself, and in some instances would be suitable without anything more. However, the factor transferred, without the mechanism about to be described, requires the use of the transferred value in the next cycle of machine operation. In many instances it is desired to transfer to a storage mechanism the factor accumulated in the register 72; and to hold it for a period in the storage mechanism, from which it can be used when, and as often as, desired. The mechanism of my invention lends itself readily to such a factor storage mechanism, which will now be described.

The preferred form of my storage mechanism is shown in FIGS. 1 and 2, and includes, in each order, a gear 400 which is slidably and rotatably mounted on a transverse shaft 401. This gear 400 is adapted to mesh with the gear 323 when desired, but normally will be disengaged therefrom, as shown in FIG. 2. The idler gear 400 is constantly in mesh with a wide gear 402 which is attached to a dial 403. The dial 403 and its drive gear 402 are rotatably mounted on a transverse shaft 408, and are held against longitudinal displacement on the shaft by means of an integral collar 404 which abuts against ordinally arranged separator plates 405. The idler gears 400 can be longitudinally, or axially, shifted along their shaft 401 to connect the gears 323 to the wide dial gears 402, or to disengage the train by any suitable means, such as a pair of flanges 406 for each idler 400 mounted on a bar 407, the two flanges 406 embracing the idler 400 between them.

The shift bar 407, and with it the idlers 400, is shiftable to engaged or disengaged position at the discretion of the operator. A simple form of mechanism for controlling such shifting is shown in FIG. 2, and comprises a shift control key 415 mounted on the upper end of a lever 416, which lever is rotatably mounted on the frame plate 23 by any suitable means, such as the pivot stud 417. The lever 416 carries a cylindrical member 418 rigidly secured thereto and rotating on the axis of stud 417, in which member is formed a laterally displacing cam slot 424, the configuration of which is shown in FIG. 2. The cam slot 424 is engaged by a follower pin 419 mounted on a bar 420. The bar 420 can be resiliently biased toward the right, such as by spring 421 compressed between a collar 422 thereon and the left frame plate 24, as shown in FIG. 2. The bar, or shaft, 420 is connected to the flange bar 407 by any suitable means, such as a connector plate 423 pinned to the two bars. Thus the rocking of the key 415 (counter-clockwise in FIG. 7) causes the cam slot 424 to force the collar 419 and its bar 420 to the left, thereupon shifting bar 407 and its ordinally arranged flanges 406 in the same direction. Such shifting moves the idler gears 400, to the left in FIG. 2, so as to cause them to engage the gears 323 and thus connect the auxiliary slides 120 to the check dials 403.

A zero stop plate 430 is formed on the collar 432 of the idler gear 400. This stop plate 430 is formed as shown in FIG. 1, and has a tooth, or projection, 433 adapted to abut against a pin 431 riveted on, or otherwise rigidly secured to, the adjacent spacing plate 405. The pin and stop plate are so arranged angularly with respect to the idler 400 that they engage when the dial 403 is in its "0" position. In the preferred form of my invention, the pin 431 and zero stop plate 430 are so formed that the two will always coact, regardless of the position of the idler 400, which means that the dial can never rotate between the "9" and "0" positions, but only from "0" through the values "1," "2," etc. to "9," and back to "0."

If a value is transferred from the register 72 into the auxiliary slides 120 and the storage control key 415 is rocked (counter-clockwise in FIG. 7) to shift the idlers 400 into mesh with the gears 323, and the detent latch 324 is then released by depression of the keyboard clear key, the springs 121 will return each auxiliary member 120 to its "0" position. In so doing, each gear train comprising the rack 320, gear 322 and its integral larger gear 323, idler 400, wide gear 402 and dial 403, will be rotated corresponding amounts from the "0" positions. That is, each dial 403 will be rotated a differential amount from the "0" position (in which the stop plate abuts against the pin 431 corresponding to the number of increments the auxiliary member 120 has been moved from its normal, or "0," position to its adjusted position determined by the blocking of its related tens-transfer mechanism. Such differential operation of the dials causes the dials 403 to give a visual reading of the value set therein, for it is obvious that they were moved from their "0" positions forwardly to a value representing the value transferred into the auxiliary members 120. Thereafter, at any time, or from time to time as desired, the value can be set into the selection mechanism and used in various computations. Thus, if the auxiliary drive mechanism comprising the shaft 156 and ordinarily arranged arms 165 are operated, with idler gears 400 engaged with gears 323 (without engaging the gears 220, 221 or 60 to 70), the auxiliary members 120 will be translated forwardly until rotation of the dials 403 is blocked by engagement of "0" tooth 433 with pins 431, i.e., a number of increments depending on the value standing in the dials 403. Such movement of the auxiliary members 120 will, of course, rotate the idler gears 400 and with it the stop plates 430 until the stop plates abut against the zero stop pins 431. Further rotation being impossible, the auxiliary slides 120 will have assumed a position representative of the transferred value and the selection slides 33, 34 will have been set accordingly. This factor can be used time and time again, when and as desired, so long as the gear train is kept in mesh.

Obviously the gears 323, and consequently gears 400 and slides 120, are latched in the adjusted position by the respective detents 324, as previously described. The factor will remain in the selection slides 32, 33 until the keyboard clear key is depressed to rock the detents 324 to their releasing positions; whereupon the springs 121 will return their respective auxiliary slides 120 rearwardly and drive gears 323 and 400 back to the position representative of the transferred value. Whenever it is desired to erase such a factor, it is only necessary to shift the idler gear 400 to the disengaged position shown in FIG. 2, which preferably can occur only at a time when the slides 120 are in a forward position representative of a transferred value. In this situation, the dials 403 and gears 400 stand at "0," for they have been rotated backward from an angular position representative of a transferred value to stop the respective slides in the proper value positions. Incidentally, at this time the intermediate gears 400 can be moved to the disengaged position for a notch 441 of a plate 440 registers with the zero stop pin 431, as will next be described. In such an event, the dials remain at "0"; the idlers 400 are shifted to the right to their inoperative positions; and then the slides can be released to return to their "0" positions by operation of the keyboard clear key 100.

I prefer to provide means for preventing the axial translation of the idler 400 unless the dials 403 are in their "0" positions, as a safety factor to prevent loss of a factor accidentally. Such a protective device is not essential to my invention or its operation, but it is desirable as it prevents accidental loss of factors. A simple form of such a protective device can comprise a plate 440 provided with a single notch 441 adjacent the "0" position of stop plate 430. This plate is located to the left of the zero stop plate 430, as shown in FIG. 2, so that once the idler 400 is shifted into the meshing position (to the left of that shown in FIG. 2), the plate 440 clears the end of pin 431. Then, if the dial is in any position except "0" it cannot be returned to its disengaged position for the plate 440 abuts against the end of the pin 431, thereby blocking disengagement of the gears until the dial has been returned to its "0" position. The dial can readily be cleared to "0" by operating the key which controls the transfer from the storage mechanism, which returns the dial to "0." Thereafter key 415 can be operated to disengage gears 400 from their respective gears 323.

In the preferred form of my invention, the transfer of a value from the storage dials 400 into the selection mechanism is controlled by depression of the back-transfer key 180, previously described. However, the operation of the storage control key 415, in the preferred form of my invention, will have been operative to disable the floating link 245, so that the operation of the mechanism under control of the back-transfer key 180 will be ineffective to connect the gears 60 to gears 70 and gears 221 to gears 220. This can be readily accomplished by means of a lever 450 pivoted on a screw stud 455, as shown FIG. 7. The rear end of the lever is provided with a cam face 451, which, when the control lever 416 is rocked to its operative position (counterclockwise in FIG. 7), permits the lever 450 to rock (counterclockwise in this figure) under the bias of its spring 452, which is tensioned between a stud on the lever and a stud on the frame plate, as shown. The forward end of the lever 450 is provided with a roller 453 which engages the upper edge of the floating link 245. The spring 452 will be considerably stronger than the spring 248, so that the release of lever 450 from control of lever 416, enables teh lever 450 to rock and thereby rock the floating lever 245 downwardly to its inoperative position, against the force of the latter's spring 248. Thus the floating lever 245, although reciprocated by depression of the back-transfer control key 180, will be ineffective to set the digitation control spool 60 or to shift the comb 225. However, the depression of the back-transfer control key will have caused the feed mechanism comprising the cam 150, follower arm 151, the linkage connecting it to the shaft 156, and feed arms 165, to be operated to resiliently move the auxiliary members 120 to the position determined by the value standing in the dials 403.

When, however, the lever 416 is returned to the position shown in FIG. 7, the roller 454 on the lower end thereof cams the lever (clockwise in FIG. 7), thereupon releasing the floating link 245 to the bias of its spring 248 and re-enabling the machine for a back-transfer operation. It will be noted in this connection that the key 415 and its lever 416 cannot be returned to the position shown in FIG. 7 unless and until the factor stored in the dials 403 has been erased, and these dials stand in their "0" position. Obviously, the bar 407 cannot shift the idler gears 400 to the right unless the dials 403 are in their "0" position, for otherwise the pins 431 abut against the faces of the plates 440 and prevent such shifting. Unless the bar 407 is free to move to the right, it is obvious that the bar 420 is likewise prevented from returning to the right, and the engagement of the pin 419 in the cam slot 424 prevents rocking of the lever 416 unless the bars 420 and 407 are free to move to the right.

It is obvious that it is desirable to provide means for preventing a back-transfer operation when a value is already set in the storage mechanism, as the value standing in the mechanisms at such a combined operation would be neither the value formerly in the register nor the value formerly in the storage mechanism, but a combination of the lowest ordinal digits of each factor. While the interlock just described is not essential to the operation of either the back-transfer mechanism or the storage mechanism, some such means will prevent misoperation by an operator. The interlock just described will be effective to provide for selectively enabling either the back-transfer mechanism or the storage mechanism, but preventing operation of the former when a value is held in the storage mechanism.

The register dials 403 can be used as a duplex register for the storage of grand totals. This result can be secured by transferring the value accumulated in the register dials 72 into the auxiliary members 120 and thence into the storage dials 403. Thereafter, when a second total has been secured in the accumulator register 72, which it is desired to add to the first total, the value stored in the dials 403 can be transferred into the selection mechanism by operation of transfer control key 180, and thence into the register dials 72 by depression of a convention plus bar, not shown. Thereupon the total of the two items will apepar in the accumulator registers 72. This grand total can be stored by again transferring the value back into the auxiliary members and thence into the dials 403, from whence they can be transferred into the accumulator register 72 when and as desired. It is obvious that because there is no tenstransfer between the dials 403, and in the preferred form they cannot rotate through the "0" position, totals cannot be accumulated directly in the dials 403. However, they can be accumulated in the register dials 72, using the constant factor register dials 403 for storage of totals previously accumulated.

*Operation.*—The operation of the constant factor, or factor storage, mechanism above-described, is believed to be obvious. The factor to be stored will first be set in the accumulator dials 72, usually by the accumulation of values therein. The back-transfer key will then be operated with the storage control key 415 in its normal, or inoperative position (in the clockwise position shown in FIG. 7), whereupon the factor appearing in the accumulator register is transmitted into the auxiliary members 120. The storage control key 415 is then rocked to its operative position (counter-clockwise from that shown in FIG. 7) which causes the lateral translation of the idler gears 400 into mesh with the gears 323 that are directly connected to the racks of the auxiliary slides 120. The keyboard clear key is then depressed, which operates the bellcrank detent latch 324, causing it to release the gears 323. The springs biasing the auxiliary slides to their "0" position then are operative to return the auxiliary slides to the "0" position, which, through the gearing shown in FIGS. 1 and 2, rotates the dials 403 a differential amount corresponding to the setting of the auxiliary slides. The machine can then be operated in a conventional manner, as it will be understood that the use of the value keys 30 and the conventional selection slides 33, 34, are completely independent of the auxiliary slides 120 in ordinary operations. It is only when it is desired to transfer a value from the register 72, or from the storage mechanism including the dials 403, that the auxiliary slides 120 are operated, by manipulation of the back-transfer key 180. When a value is stored in the storage dials 403, the resilient operation of the auxiliary slides will rotate the dials back to their respective "0" positions thereby setting the stored value into the selection mechanism.

MODIFIED STORAGE MECHANISM

*Modified constant factor mechanism.*—The mechanism of my invention is particulary adapted for use in connection with a constant factor mechanism which can be built into the machine. One example of such a factor would be the constants particularly useful in converting decimal values to an octal system. It is well known that these conversion factors are:

1. 262144—$8^6$
2. 327680—$8^5$
3. 409600—$8^4$
4. 512000—$8^3$
5. 640000—$8^2$
6. 800000—$8^1$
7. 1000000—

If a factor to be converted from the decimal system to the octal is registered as a dividend in the accumulator of a calculating machine and the first of these factors is subtracted therefrom to an overdraft, the overdraft corrected, the carriage shifted one step to the left, and then the second factor subtracted to an overdraft, etc., the proper octal factor is secured. My invention will be explained in connection with a constant factor mechanism for such conversion, although it will be understood that it would be equally useful in connection with a constant factor mechanism adapted to insert the decimal equivalents of common fractions, such as eighths, or twelfths, or sixteenths, or to insert factors for interest computations, and the like.

In this embodiment of my invention, which is particularly shown in FIGS. 8 and 9, I provide a transverse shaft 500 across the front of the machine, immediately in front of the front ends of the auxiliary slides 120. On this shaft I place a number of ordinally arranged cam disks 501 which can be separated one from another by integral collars 502, or separate spacing sleeves as desired. The periphery of these cams lie immediately adjacent the pins 122 located on the forward ends of the auxiliary slides 120, and are, therefore, effective to prevent forward movement of the auxiliary members 120 if opposite the periphery of the cam disks 501. The disks are rigidly secured to the shaft 500 so that rotation of the shaft will rotate the disks correspondingly. The periphery of the disks are provided with notches 503 of a differential depth corresponding to the factor desired to be inserted in the constant factor mechanism. For example, utilizing the octal conversion factor above-mentioned, and which is illustrated in the disks shown in FIG. 8, it will be seen that the notches provide for differential movement of the ordinally related auxiliary member 120, the pin 122 of which can enter the notches 503. In the figures shown, the disk for the first order (upper left-hand corner, and indicated by the numeral "1" therebelow), shows a notch which permits a differential movement of the units order auxiliary slide 120 of four increments in the first position, but block operation of the auxiliary member 120 in all other positions of the shaft. Similarly, the disk in the tens order (the second from the left top row, indicated by the numeral "2" therebelow) shows a factor of "4" in the first position and of "8" in the second position, but "0's" in all other positions of the shaft and affixed cams, etc.

Normally only one constant factor mechanism would be used in a machine, so only the storage dials 403 or the auxiliary storage mechanism comprising the cam plates 501, would be used in any one machine. It therefore is unnecessary to provide an interlock between the two storage mechanisms for I anticipate that only one would be used in any machine. However, if it is desired to combine both in a single machine, then it would be necessary to provide in each plate cam 501 a slot in a predetermined angular position, which slot would be of sufficient depth to permit the forward movement of the auxiliary slides to the "9" position. Such a slot is shown by the dotted slots 505 in FIG. 8. In the event it was desired to put both storage mechanisms in the same machine, it would also be necessary to provide an interlock between the two storage mechanisms, as will now be mentioned.

It is believed obvious that the use of the auxiliary members 120 for a constant factor of this alternate type requires that either the gears 220, 221 or 62, 70, or both, be disengaged so as to prevent the factors in the accumulator register 72 from interfering with the setting of the slides by the factors in the disks 501. As a matter of fact, a machine with this type of constant factor mechanism might well omit the back-transfer mechanism entirely. It would be necessary also that the intermediate gear 400 be shifted to the right (in FIG. 2) so as to disengage the gear 323 from the dial gear 402, so as to prevent interference from the storage members. The disengagement of the register on the one hand or the storage mechanism on the other can readily be secured by a mechanism such as shown in FIG. 7. Preferably this comprises a second lever 510 mounted on the right frame plate 23, adjacent the lever 416 previously mentioned. This lever likewise has a roller on its lower end (similar to roller 454 on lever 416) which engages the rear cam end of a lever 511 similar in shape to lever 450 and likewise pivotally mounted on the frame plate as upon screw stud 45. The second lever 511 carries a roller 512 at its forward end, which likewise engages the floating link 245 so that the rocking of the lever 511 (counter-clockwise in FIG. 7) depresses the forward end of the floating link 245 to render it inoperative. Further, it is necessary to provide an interlock between lever 510 and lever 416, so that only one of these levers can be in its forward position. This can readily be accomplished by a two-armed lever 513 pivotally mounted on a bracket 514 between the two levers 416 and 510. It is obvious that if the key 415 and lever 416 are in their forward positions, counter-clockwise from that shown in FIG. 7, the transfer mechanism is disengaged from the auxiliary slides 120 and the gears 323 and 400 are engaged to control setting of the slides 120 by the constant factor mechanism first described; and that if the lever 510 is in its forward, or counter-clockwise, position, the link 245 is also in an inoperative position so that the gear trains 220, 221 or 60, 70 are disengaged, but the first constant factor mechanism including gears 400 and dials 403 is not rendered operative, in which situation only the factor standing in the cam disks 501 would be effective to control the positioning of the auxiliary slides 120; and if both levers 416 and 510 are in the rearward position shown, then the back-transfer mechanism is operative.

If the back-transfer mechanism is operated while the gears 220, 221 or 62, 70, or both, are disengaged, and the storage dials 403 are disengaged from gears 323, the auxiliary members 120 will be resiliently moved forwardly (to the right in FIG. 8) until motion is blocked by the pin 122 striking either the periphery of the plate or the end of a notch 503. The shaft 500 can be rotated by any suitable means either manually, as by rotation of a knob 504, shown in FIG. 9, or by automatic means if desired, to present the different factors to the auxiliary slides. Thus, the rotation of the shaft 500 and its plates 501 will sequentially and selectively set the cam mechanisms to control the setting of values into the auxiliary members 120 as desired by the operator. The factors exemplified in FIG. 8 illustrate those necessary for a conversion from a decimal to an octal system, whereby the rotation of the shaft 500 (counter-clockwise in FIG. 8), in single angular increments between the ordinal series of operations, present the necessary conversion factors in proper sequence.

It is obvious, of course, that this modified form of constant factor mechanism provides for factors to be built into the machine at the factory, or which can be changed only by changing one shaft assembly for another, which would take a little time. Thus, this modified form of constant factor mechanism, while utilizing the back-transfer and constant factor slides 120 of my invention, does not provide for flexible operation in which the factors are changed at the will of the operator. They do, however, provide for a very rapid means for setting a factor that is often used into the machine as, and when, desired.

It will be obvious that this modified constant factor mechanism can be used for storing any kind of constant factors which may be desired. These factors can be set into the machine by manipulation of the constant factor assembly comprising the shaft 500 and the cam plates 501 mounted thereon, as by means of rotating the knob 504. It will be obvious that this knob can carry indicia to show the factor used, and the whole assembly rotated to insert whatever factor is desired. After rotation of the knob and the other elements of the assembly, the back-transfer key will be depressed by the operator, whereupon the movement of the auxiliary members 120 will set that factor into the selection mechanism and then it can be used in any kind of a calculating machine operation.

It will be understood that although the present invention has been described as applied to a calculating machine of the type described in the Friden Patent No. 2,229,889, it is equally applicable to any calculating or adding machine utilizing selecting slides for the setting of values into the machine.

It will also be understood that the invention is not limited to the exact details but may comprehend other arrangements or features, for manifestly the arrangement shown is capable of considerable modification by persons skilled in the art without departing from the spirit of the invention.

I claim:
1. In a calculating machine having a plurality of ordinally arranged accumulator register members, stop means for stopping said register members at their "0" positions, ordinally arranged selection mechanism including ordinally arranged and differentially positionable selection bars and a keyboard operable to position said bars, and selectively operable means for operatively connecting said register members to the ordinally related selection members, the combination which comprises a power-driven operating means for resiliently moving saild ordinal selection bars toward an extreme value position, and manual means operative to position said connecting means to connect said register members to said selection members, to operate said stop means, and for thereafter operating said resilient operating means, whereby the operation of the resilient selection members returns the register members to their respective "0" positions.

2. In a calculating machine having an ordinally arranged accumulator register, means for stopping the various orders of the register in their "0" positions, and a selection mechanism including differentially positionable indexing bars and a keyboard operable to position said bars, a plurality of ordinally arranged auxiliary members associated with the respective ordinal selection bars and operative to differentially position said selection bars, power means for resiliently operating said auxiliary members, connecting means for selectively connecting said register to said auxiliary members, a back-transfer member, and means operated by said back-transfer member for operating said connecting means to connect said register to said auxiliary members and for operating said power means.

3. In a calculating machine having ordinally arranged accumulator register gear assemblies, means for stopping the various register gear assemblies in their "0" positions, an ordinally arranged selection mechanism, digitating gear assemblies operative to enter a value determined by said selection mechanism into said register gear assemblies, a plurality of ordinally arranged auxiliary members associated with the respective ordinal constituents of the selection mechanism and operative to differentially position said selection mechanism, power means for resiliently operating said auxiliary members, connecting means for selectively connecting said digitating gear assemblies to said register gear assemblies and to said auxiliary members, a back-transfer member, and means operated by said back-transfer member for operating said connecting means to connect said digitating gear assemblies to said register gear assemblies and to said auxiliary members and for operating said power means.

4. The apparatus of claim 3 comprising also a detent means normally engaging at least one set of said gear assemblies, releasing means for moving said detent means out of engagement with said one set of said gear assemblies, and means operated by said said back-transfer member for operating said releasing means.

5. In a calculating machine having ordinally arranged accumulator register elements, means for stopping the various ordinal register elements in their "0" positions, an ordinally arranged selection mechanism, means including a key for erasing a value from said selection mechanism, a digitating means operative to enter a value determined by said selection mechanism into said register, a plurality of ordinally arranged auxiliary members associated with the selection mechanism and operative to differentially position said selection mechanism, power means for resiliently operating said auxiliary members, connecting means for selectively connecting said digitating means to said register elements and to said auxiliary members, a back-transfer member, means operated by said back-transfer member for operatively connecting said digitating means to said register and to said auxiliary members and for operating said power means, means for disabling said back-transfer member, and means operated by said key for releasing said disabling means.

6. In a calculating machine having an ordinally arranged accumulator register, zero stop means for stopping the various orders of said register in their "0" positions, an ordinally arranged selection mechanism, a digitating means operative to enter a value determined by said selection mechanism into said register additively or subtractively, a plurality of ordinally arranged auxiliary members associated with the selection mechanism and operative to differentially position said selection mechanism, power means for resiliently operating said auxiliary members, detent means for resiliently holding said auxiliary members in an adjusted position thereof, connecting means for selectively connecting said digitating means to said register and to said auxiliary members, a back-transfer member, means operated by said back-transfer member for operating said zero stop means, for operating said connecting means to connect said digitating means to said register for subtractive operation and to said auxiliary members, and for operating said power means, and means for releasing said detent means.

7. In a calculating machine having an accumulator register containing ordinally arranged dials, ordinally arranged selection mechanism including ordinally arranged selection bars and a keyboard for positioning said bars, digitating gear assemblies operative to enter a value determined by said selection members into said dials, and a back-transfer mechanism for transferring a value standing in the accumulator register dials into said selection bars including means for connecting said selection bars to the ordinally related accumulator register dials, an improved means for operating said back-transfer mechanism which comprises a power driven member, yieldable means for connecting said power driven member to said selection bars for operating the same whereby the selection bars can be resiliently operated while connected to said register dials to return the dials toward a "0" position, zero stop means for stopping the various register dials in their "0" positions, and means for simultaneously operating said power member, said connecting means and said zero stop means to cause the register dials to be returned in their "0" positions, thereby differentially positioning the selection bars to a value corresponding to that in said dials prior to such operation.

8. In a calculating machine having ordinally arranged accumulator register members, zero stop means for stopping each member in its "0" position, an ordinally arranged selection mechanism including differentially positionable value indexing bars and a keyboard operable to position said bars, digitating gear assemblies operative to enter a value determined by said bars into said register members, connecting means for operatively connecting said indexing bars to the ordinally related register members, and means for positioning said connecting means in operative position, the combination which comprises, drive means operating through a path of constant magnitude, resilient means operatively connecting said indexing bars to the drive means, a manually operated member, and means operated by said manually operated member for positioning said connecting means in connecting position, for operating said zero stop means, and for operating said drive means.

9. The apparatus of claim 8 wherein said zero stop means comprises a tens-transfer mechanism between the respective orders of the accumulator register and means for blocking operation of said tens-transfer means.

10. The apparatus of claim 8 comprising also a plurality of ordinally arranged rotatable storage members, means for connecting said storage members to the ordinally related indexing bar during operation thereof by said resilient means, means for stopping rotational movement of the storage members in a predetermined angular position, and means for differentially rotating said storage members away from said predetermined angular position.

11. In a calculating machine having an accumulator register containing a plurality of ordinally arranged accumulator elements, zero stop means for stopping the various accumulator elements in their "0" positions, a selection mechanism, a plurality of ordinally arranged digitating elements operative to enter a value determined by said selection mechanism into said register, a detent means connected with at least one set of said elements comprising a star wheel rigidly secured to each element of said one set of said elements and a spring biased member normally engaging the periphery of said star wheel, cam means for moving said spring-urged members out of engagement with said star wheels, a plurality of ordinally arranged auxiliary members associated with the respective ordinal selection mechanism and operative to differentially position said selection mechanism, power means for resiliently moving said auxiliary members, connecting means for selectively connecting said digitating elements to said accumulator elements and to said auxiliary members, a back-transfer member, means operated by said back-transfer member for operating said connecting means to connect said digitating elements to said accumulator elements and to said auxiliary members, for operating said power means, and for operating said cam member to move said spring biased members away from contact with said star wheels.

12. In a calculating machine having ordinally arranged register dial shafts, ordinally arranged actuating shafts connectable to said dial shafts, detent means connected with at least one set of said shafts comprising a star wheel rigidly mounted on each shaft of said one set of said shafts, a spring biased member normally engaging the periphery of each of said star wheels, an ordinally arranged selection mechanism, and a back-transfer means for setting said selection mechanism from clearing said dial shafts including a clearing means for rotating said dial shafts to a "0" position, the combination which comprises a cam slide having spaced angularly disposed projections adapted to engage said spring-urged members to move the same out of engagement with said star wheels, and means operated by said back-transfer means for operating said cam slide to move said spring biased members away from contact with said star wheels.

13. In a calculating machine having an ordinally arranged selection mechanism containing differentially positionable selection bars, a keyboard for positioning said bars, an improved means for differentially positioning said bars to represent a preselected factor which comprises a power driven member, yieldable means for connecting said power driven member to said selection bars for operating the same toward an extreme value position, a plurality of ordinally arranged factor storage dials, gear means for selectively connecting said dials to the ordinally related positionable bar, and means for stopping said dials in their "0" positions.

14. In a calculating machine having an ordinally arranged accumulator register, zero stop means for stopping the various orders of said register in their "0" position, an ordinally arranged selection mechanism, a digitating means operative to enter a value determined by said selection mechanism into said register, a plurality of ordinally arranged auxiliary members associated with the respective orders of said selection mechanism and operative to differentially position said selection mechanism, power means for resiliently moving said auxiliary members, connecting means for selectively connecting said digitating means to said register and to said auxiliary members, a manually operable back-transfer control member, means operated by said back-transfer control member for operating said zero stop means, for operating said connecting means to connect said digitating means to said register and to said auxiliary members, and for operating said power means, a plurality of ordinally arranged factor storage members positionable to block operation of said auxiliary members in predetermined differential positions upon operation of said power means, means for selectively positioning said factor storage members, and a second manually operable member for disabling said connecting means, thereby placing operation of said auxiliary members under the control of said factor storage members.

15. In a calculating machine having a plurality of ordinally arranged accumulator register members, stop means for stopping said register members at their "0" positions, ordinally arranged and differentially positionable selection bars, and register actuating means operated by said selection bars for entering differential values determined by said selection bars into said accumulator members, the improvement which comprises selectively operable means for operatively connecting said register actuating means to the ordinally related selection bars, a power-driven operating means for resiliently moving said ordinal selection bars toward an extreme value position, and manual means operative to position said connecting means to connect said actuating means to said selection bars, to operate said stop means, and for thereafter operating said resilient operating means, whereby the operation of the resilient selection members returns the register members to their respective "0" positions and positions the selection bars in a differential position corresponding to the value formerly in the coordinal accumulator members.

16. In a calculating machine having an ordinally arranged register and a selection mechanism containing ordinally arranged pairs of differentially positionable selection bars and a keyboard for positioning said bars, one of each pair of said bars being operative for digital values of a lower magnitude and the other for digital values of a higher magnitude, an improved means for differentially positioning said bars to represent a selected one of a series of predetermined factors which comprise a power driven member, ordinally arranged auxiliary members adapted to connect said power driven member to said selection bars for operating the same toward an extreme value position, yieldable means connecting said power driven member to said auxiliary members, means operated by the auxiliary members for first operating the respective selection bars of lower magnitude and then the selection bar of higher magnitude, a shaft, a plurality of ordinally arranged cams mounted on said shaft for rotation therewith and each adapted to be engaged by the respective auxiliary member, series of angularly aligned notches in the periphery of said cams, each of said notches having a depth corresponding to the value of the respective ordinal digit of a predetermined factor whereby each series of notches represents a predetermined factor, and means for rotating said shaft and thereby presenting a selected series of notches representing a selected factor to said yieldable members.

17. In a calculating machine having a selection mechanism containing ordinally arranged pairs of selection bars differentially positionable longitudinally to represent various digital values and a keyboard for positioning said bars, one of each pair of said bars being operative for digital values of a lower magnitude and the other for digital values of higher magnitude, an improved means for differentially positioning said bars to represent a selected one of a series of predetermined factors which comprises a power driven member, ordinally arranged and longitudinally positionable auxiliary members operated by said power driven member and adapted to be moved thereby in differential increments corresponding to movements of the selection bars, yieldable means connecting said power driven member to said auxiliary members, a yieldable connection between said auxiliary members and their respective selection bars of lower magnitude, lost motion means for connecting said auxiliary members to their respective selection bars of higher magnitude, a shaft, a plurality of ordinally arranged cams mounted on said shaft for rotation therewith and each adapted to be engaged by the respective auxiliary member, series of angularly aligned notches in the periphery of said cams, each of said notches having a depth corresponding to the value of the respective ordinal digit of a predetermined factor whereby each series of notches represents a predetermined factor, and means for rotating said shaft and thereby presenting a selected series of notches representing a selected factor to said yieldable members.

References Cited in the file of this patent

UNITED STATES PATENTS

| | | |
|---|---|---|
| 1,041,576 | Behr | Oct. 15, 1912 |
| 1,969,262 | Friden | Aug. 7, 1934 |
| 2,305,780 | Henzelmann | Dec. 22, 1942 |
| 2,325,388 | Friden | July 27, 1943 |
| 2,399,170 | Chase | Apr. 30, 1946 |
| 2,570,456 | Karr | Oct. 9, 1951 |
| 2,722,376 | Ellerbeck | Nov. 1, 1955 |
| 2,734,683 | Turck | Feb. 14, 1956 |

FOREIGN PATENTS

| | | |
|---|---|---|
| 602,353 | Germany | Sept. 8, 1934 |
| 203,473 | Switzerland | June 16, 1939 |
| 218,923 | Switzerland | Sept. 16, 1947 |

UNITED STATES PATENT OFFICE
CERTIFICATION OF CORRECTION

Patent No. 3,003,690                                                                  October 10, 1961

Grant C. Ellerbeck

It is hereby certified that error appears in the above numbered patent requiring correction and that the said Letters Patent should read as corrected below.

Column 1, line 55, for "adaped" read -- adapted --; column 5, line 56, for "is", first occurrence, read -- a --; column 7, line 75, for "side" read -- slide --; column 9, line 50, after "with" insert a comma; column 17, line 5, for "auxiilary" read -- auxiliary --; column 18, line 12, for "teh" read -- the --; line 26, after "lever" insert -- 450 --; line 69, for "apepar" read -- appear --; column 19, line 38, after "positions" insert a comma; column 22, line 13, for "saild" read -- said --; line 59, strike out "said", second occurrence; column 25, line 39, for "comprise" read -- comprises --.

Signed and sealed this 6th day of November 1962.

(SEAL)
Attest:

ERNEST W. SWIDER                                                  DAVID L. LADD
Attesting Officer                                                  Commissioner of Patents